(12) United States Patent
Yamamoto

(10) Patent No.: US 11,459,275 B2
(45) Date of Patent: Oct. 4, 2022

(54) WATER-BASED PAINT

(71) Applicant: One Will CO., LTD., Yokohama (JP)

(72) Inventor: Baisyo Yamamoto, Yokohama (JP)

(73) Assignee: ONE WILL CO., LTD., Yokohama (JP)

(*) Notice: Subject to any disclaimer, the term of this patent is extended or adjusted under 35 U.S.C. 154(b) by 580 days.

(21) Appl. No.: 16/588,968

(22) Filed: Sep. 30, 2019

(65) Prior Publication Data

US 2020/0317577 A1 Oct. 8, 2020

(30) Foreign Application Priority Data

Apr. 7, 2019 (JP) ................. JP2019-73219

(51) Int. Cl.
  *C04B 33/18* (2006.01)
  *C04B 33/04* (2006.01)
  *C04B 33/13* (2006.01)

(52) U.S. Cl.
  CPC .............. *C04B 33/18* (2013.01); *C04B 33/04* (2013.01); *C04B 33/131* (2013.01); *C04B 33/1305* (2013.01); *C04B 2235/349* (2013.01); *C04B 2235/3418* (2013.01); *C04B 2235/3427* (2013.01)

(58) Field of Classification Search
  None
  See application file for complete search history.

(56) References Cited

U.S. PATENT DOCUMENTS

2022/0081565 A1* 3/2022 Liu .................. C08K 5/098

FOREIGN PATENT DOCUMENTS

| CN | 109423155 | 3/2019 |
|---|---|---|
| JP | 47-6029 | 2/1972 |
| JP | 2004-250908 | 9/2004 |
| JP | 5136872 B | 11/2007 |
| JP | 2012-057042 | 3/2012 |
| JP | 2006-22141 A | 1/2016 |
| JP | 2016-160289 | 9/2016 |
| JP | 2019-137850 | 8/2019 |

OTHER PUBLICATIONS

Decision of a Patent Grant for corresponding JR Application No. 2019-073219, dated Jan. 21, 2021.

* cited by examiner

*Primary Examiner* — Jeffrey D Washville
(74) *Attorney, Agent, or Firm* — Mori & Ward, LLP

(57) ABSTRACT

A water-based paint includes a fine powder composition which includes fine powdery clay minerals comprising pyrophyllite and sepiolite, a fine powdery thixotropy support agent containing hydroxypropyl methylcellulose and comprising first and second agents having 2 percent by weight aqueous solution viscosities at 20° C. of 2400 mPa·S to 4500 mPa·S and 64000 mPa·S to 90000 mPa·S, respectively, and a fine powdery inorganic porous material comprising diatomaceous earth and zeolite. A thixotropic index when the fine powder composition is dispersed and dissolved in water is 3.0 to 4.0. The thixotropy support agent includes 67 to 91 percent by weight of the first agent and 9 to 33 percent by weight of the second agent.

4 Claims, No Drawings

WATER-BASED PAINT

CROSS-REFERENCE TO RELATED APPLICATIONS

The present application claims priority under 35 U.S.C. § 119 to Japanese Patent Application No. 2019-73219, filed Apr. 7, 2019. The contents of this application are incorporated herein by reference in their entirety.

BACKGROUND OF THE INVENTION

Technical Field

The present invention relates to a water-based paint.

Discussion of the Background

With the recent progress of housing technology, highly airtight and highly heat-insulating houses have been increased, and measures against hot and cold weather have been improved. Also, the 2002 amendment to the Japanese Building Standards Act stipulates that measures against sick buildings should be taken. However, sick building syndrome sufferers due to various causes, such as insufficiently ventilated houses, furniture, home appliances, and household chemical substances (pesticides, aromatic agents, etc.), have not been reduced so far. As typified by the term "indoor air quality (IAQ)," the cleanliness of indoor air and health are closely related to each other. The contamination of air is known to cause various diseases, such as allergic symptoms, and improvements in air cleanliness are being requested.

To solve the above problem, the applicant has developed a material that finishes an interior, such as wall paper or a plastering material, includes a porous inorganic mineral as a main component, and has moisture controllability and applicability. Specifically, the porous inorganic mineral is a silicate mineral selected from clay minerals including diatomaceous earth and acid clay, and the interior finish material is prepared by adding 3 to 10% of urea to the porous inorganic mineral. Thus, the interior finish material adsorbs and traps formaldehyde and methylolates the trapped formaldehyde to dewater and stabilize it. The interior finish material further methylenates the methylolated formaldehyde using the solid acid catalyst component of the mixed silicate mineral to stabilize and render such formaldehyde harmless while promoting a condensation reaction (hereafter, this interior finish material is referred to as the "conventional interior material") (Japanese Patent No. 5136872).

Also, there is known a water-based paint prepared by mixing water with a powder composition that includes (A) 35 to 65 percent by volume of diatomaceous earth and (B) 30 to 60 percent by volume of zeolite, porous calcium carbonate, and clay (the content of (A) diatomaceous earth and (B) zeolite, porous calcium carbonate, and clay is in the range of 90 to 99 percent by volume) and further includes a resin, chemical fiber, and calcium borate (fungicide) (hereafter, the water-based paint is referred to as the "conventional water-based paint") (Japanese Unexamined Patent Application Publication No. 2006-22141).

SUMMARY OF THE INVENTION

According to one aspect of the present invention, a A water-based paint includes a fine powder composition which includes fine powdery clay minerals comprising pyrophyllite and sepiolite, a fine powdery thixotropy support agent containing hydroxypropyl methylcellulose and comprising first and second agents having 2 percent by weight aqueous solution viscosities at 20° C. of 2400 mPa·S to 4500 mPa·S and 64000 mPa·S to 90000 mPa·S, respectively, and a fine powdery inorganic porous material comprising diatomaceous earth and zeolite. A thixotropic index when the fine powder composition is dispersed and dissolved in water is 3.0 to 4.0. The thixotropy support agent includes 67 to 91 percent by weight of the first agent and 9 to 33 percent by weight of the second agent.

DESCRIPTION OF EMBODIMENTS

Now, a preferred embodiment of the present invention will be described in detail. However, the present invention is not limited to the embodiment, and a design change can be made to the embodiment as appropriate without departing from the scope of the invention.

The conventional interior material has many functions that cope with sick buildings and clean contaminated air, and can be applied not only using a trowel but also using a brush, roller, or spray can. However, the conventional interior material is a not material developed as a paint. For this reason, the conventional interior material cannot be used to finish a fine, flat wall surface or applied easily by DIY or the like. The conventional water-based paint has poor workability, for example, the constituent materials thereof have poor kneadability and tend to lump. It also has problems, such as poor antifungal performance.

In Japan, the number of new homes being built is declining, whereas the number of homes being reformed or renovated is increasing. For this reason, water-based paints are being requested that anyone can easily apply and that are multifunctional and safe and have excellent workability. Also, many earthquakes have occurred in Japan in recent years, and there have been victims who inhale toxic gases due to fire associated with the earthquakes. Accordingly, development of building materials that have heat resistance, as well as generate no toxic gas is also being requested.

The present embodiment has been made to solve the above problems, and an object thereof is to provide a water-based paint that has many functions, such as moisture control, deodorizing, formaldehyde reduction, fungus prevention, and antibacterial activity, as well as has excellent safety, workability, and heat resistance.

[Basic Concept of Embodiment of Water-Based Paint]

A water-based paint is required to have basic performance including (1) qualitative properties [color developability (particularly, white color developability), uniform dispersibility, freeze prevention, and water-temperature adaptability (adaptability to a wide range of water temperature) of components)], (2) workability [flexibility (applicability), dripping prevention], (3) beauty properties (application-surface concealability, beauty after being finished, predetermined surface hardness, unsettleability, long life), as well as additional performance, such as moisture control, formaldehyde reduction, fungus prevention, antibacterial activity, deodorizing, and heat resistance (incombustibility).

To realize the above types of performance, required optimum constituent materials have to be mixed. However, the properties of the constituent materials have trade-off relationships with each other, and it is difficult to simultaneously satisfy all the functions.

The present inventor realized certain levels of effects with respect to all the above functions by selecting the best constituent materials and finding the optimum mixing amounts and mixing ratios through various trials and errors.

[Constituent Materials of Present Water-Based Paint]

A fine powder composition included in the present water-based paint includes at least fine powdery clay minerals, a fine powdery thixotropy support agent including first and second agents, a fine powdery inorganic porous material, a fine powdery metal oxide having photocatalyst activity (hereafter referred to as the "metal oxide photocatalyst"), a formaldehyde reducing agent, and an auxiliary constituent material. The constituent materials and the like will be described in detail below.

Clay Minerals

The clay minerals of the present water-based paint are required to have thixotropic properties [properties that increase the velocity gradient and reduce the viscosity in response to acting shearing stress (properties that change a solid or semi-solid into a liquid by stirring)]. While there are various types of clay minerals having such properties, clay minerals suitable for the present water-based paint are required to be able to become fine powders, to have good dispersibility in water serving as a solvent, and to have good thixotropic properties. The present inventor repeatedly conducted quality tests while combining various types of clay minerals and changing the particle sizes, mixing amounts, and mixing ratio of the clay minerals considering settleability in water, water absorptivity, fluidity, bulk specific gravity, color tone, cost, and the like. As a result, the present inventor found that pyrophyllite and sepiolite are clay minerals most suitable for the present water-based paint. A first characteristic of the present water-based paint is that it includes pyrophyllite and sepiolite as constituent materials.

Pyrophyllite ($Al_2Si_4(OH)_2$) is a type of layered silicate mineral. Pyrophyllite aids the present water-based paint in having excellent slump resistance, less drip properties, and good spatula-cuttability, as well as having excellent color fastness or like when dried. Pyrophyllite also aids the present water-based paint in having high heat resistance and incombustibility and high far-infrared radiation properties, as well as having no glare (friendliness to the eyes) or the like after being applied.

Sepiolite (Hydrous Magnesium Silicate) ($Mg_8Si_{12}O_{30}(OH)_4 \cdot (OH_2)_4 \cdot 8H_2O$) is a fibrous clay mineral also called "meerschaum" and is a rock-forming mineral that is lightweight and soft and has excellent adsorptivity. Sepiolite has thixotropic properties, as well as high adsorptivity as an inorganic porous material (to be discussed later). It also has formability, shape retainability, and incombustibility. For this reason, sepiolite allows the present water-based paint to deliver composite performance without impairing physical properties and is therefore the most suitable material.

Thixotropy Support Agent

The thixotropy support agent is a material having a function of causing the clay minerals to exhibit thixotropic properties to the greatest extent possible. The present inventor repeatedly conducted quality tests while using various types of thickeners and changing the mixing amounts and mixing ratio. As a result, the present inventor found that water-soluble cellulose ether containing hydroxypropyl methylcellulose as a main component (most preferably, that surface-treated with a small amount of glyoxal) (hereafter referred to as the "present water-soluble cellulose ether) is preferred and that the present water-soluble cellulose ether most preferably includes a combination of first and second agents having different viscosities (the viscosity values of 2 percent aqueous solutions at 20° C.) and including the same component. A second characteristic of the present water-based paint is that it includes the present water-soluble cellulose ether as a constituent material.

Specifically, the present water-soluble cellulose ether is characterized in that it includes the first agent having a 2 percent by weight aqueous solution viscosity at 20° C. of 2400 mPa·S to 4500 mPa·S and the second agent having a 2 percent by weight aqueous solution viscosity at 20° C. of 64000 mPa·S to 90000 mPa·S and that 67 to 91 percent by weight of the first agent and 9 to 33 percent by weight of the second agent are mixed.

The less viscous first agent has effects of improving the dispersibility of the present water-based paint in water and increasing the fluidity of the present water-based paint in the initial stage, while the more viscous second agent has effects of improving the adhesion performance of the present water-based paint after being applied. A combination of both agents aids the clay minerals in exhibiting thixotropic properties to the greatest extent possible.

Inorganic Porous Material

The inorganic porous material contains diatomaceous earth and zeolite as main components. Diatomaceous earth is a sediment that is formed from a fossil of the hull of a diatom containing silicon dioxide as a main component, which is a type of algae. It has very excellent moisture-control properties, deodorizing properties, and incombustibility properties. To increase whiteness, it is preferred to use white diatomaceous earth among various types of diatomaceous earth having different chromaticities.

Zeolite is a material that contains silicon dioxide as a main component and has water-absorbency, adsorptivity, antibacterial properties, incombustibility, and the like. There are various types of zeolite. To increase adsorptivity, it is preferred to use zeolite having a CEC value (cation exchange capacity) of 160 meq/100 g or more (milligram equivalent per unit weight of 100 g). To increase whiteness, it is preferred to use white zeolite among various types of zeolite having different chromaticities.

Metal Oxide Photocatalyst

The metal oxide photocatalyst is a material that functions as an oxidation catalyst when visible light or ultraviolet ray is applied thereto and aids the present water-based paint in exhibiting application-surface concealability and white color developability, as well as exhibiting strength after being cured. While the most suitable metal oxide photocatalyst is titanium oxide ($TiO_2$), the metal oxide photocatalyst may be a metal oxide, such as zinc oxide ($ZnO$), tungstic trioxide ($WO_3$), tin oxide ($SnO_2$), strontium titanate ($SrTiO_3$), bismuth oxide ($Bi_2O_3$), or ferric oxide ($Fe_2O_3$).

Formaldehyde Reducing Agent

The formaldehyde reducing agent contains a urea compound, organic alkali, and acid as main components. The urea compound may be urea, methylurea, dimethylurea, ethylurea, diethylurea, or the like. In particular, ethylene urea is preferably used.

The organic amine may be an organic amine, such as primary amine, secondary amine, tertiary amine, or quaternary amine (tetramethyl ammonium hydroxide), or an organic amine compound. In particular, triethanolamine, which is a tertiary alkanol (aliphatic) amine, is preferably used. The acid may be an organic acid, such as sulfonic acid or carboxylic acid, or an inorganic acid, such as sulfuric acid or phosphoric acid. In particular, citric acid is preferably used.

Auxiliary Constituent Material

At least one of a pigment for developing a desired color, a synthetic resin (acrylic resin, vinyl acetate, e.g.,), a dispersant, a deforming agent, a fungicide, antibacterial agent, and an antiseptic agent may be added as an auxiliary constituent material to the present water-based paint to the extent that the effects of the present water-based paint are not impaired.

Where a synthetic resin is added, it is preferred to use an acrylic resin, which has excellent durability, weather resistance, and water resistance, or vinyl acetate, which has excellent adhesiveness. However, to obtain a water-based paint that causes the clay minerals to exhibit thixotropic properties and has excellent heat resistance, it is most preferable to use both acrylic resin and vinyl acetate resin.

Present Water-Based Paint

The fine powder composition included in the present water-based paint is required to a fine powder. To improve the dispersibility, the particle size of the fine powder composition is preferably 10 μm or less, more preferably 3 μm or less. The bulk specific gravity of the fine powder composition included in the present water-based paint is preferably 0.4 or less in terms of workability and economical efficiency.

In order for the present water-based paint to achieve securing of a predetermined viscosity and prevention of dripping when applied, which are contradictory requirements, the present water-based paint is required to be prepared by adding 1.0 to 3.0 weight parts of water to 1 weight part of the fine powder composition (if the amount of water is less than 1.0 weight part, the viscosity becomes strong, reducing applicability; if the amount of water exceeds 3.0 weight parts, dripping occurs), and the thixotropic index (TI value) is required to be 3.0 to 4.0. If the thixotropic index is less than 3.0, dripping occurs; if it exceeds 4.0, the viscosity becomes too strong, reducing workability.

The thixotropic index is an index indicating thixotropy and is an index indicated by the ratio ($\eta b/\eta a$) between the viscosity values ($\eta$) at different rotation velocities a and b (a>b) at a predetermined temperature. That is, the thixotropic index is a parameter indicating physical properties by which the present water-based paint solates when stirred and re-gels when left alone. A small value thereof means that the viscosity is low (close to water); a large value thereof means that the viscosity is high. The thixotropic index of the present embodiment is "$\eta 2/\eta 20$", which is the viscosity ratio between 2 rpm and 20 rpm measured in accordance with "JIS 6024 2015 Building repairing/reinforcing epoxy resin 5.8 thixotropic index test."

To deliver predetermined types of performance, the fine powder composition is required to be a mixture containing, as main components, fine powders of the clay minerals, thixotropy support agent, inorganic porous material, metal oxide photocatalyst, and formaldehyde reducing agent, and it is required to mix 0.02 to 0.10 weight part of the thixotropy support agent, 1.0 to 3.0 weight parts of the inorganic porous material, and 0.1 to 1.0 weight part of the metal oxide photocatalyst with 1 weight part of the clay minerals. Also, it is required to add a predetermined amount of the formaldehyde reducing agent such that the effects are obtained.

If the amount of thixotropy support agent among the mixing amounts is less than 0.02 weight part, dripping occurs; if it exceeds 0.1 weight part, the viscosity becomes too strong, reducing workability. If the amount of the inorganic porous material is less than 1.0 weight part with respect to 1 weight part of the clay minerals, the white color developability is reduced, resulting in a reduction in the base-material concealability after being applied, thus failing to satisfy predetermined beauty performance. If the amount of inorganic porous material exceeds 3.0 weight parts, the balance among the mixing amounts of the constituent materials is lost, resulting in a strong viscosity and thus in less applicability.

If the amount of metal oxide photocatalyst is less than 0.1 weight part, predetermined effects cannot be obtained; if it exceeds 1.0 weight part, there occurs a reduction in cost-effectiveness and the impairment of applicability and moisture controllability.

The present inventor repeated demonstration tests and comprehensively determined the workability and other types of performance. The present inventor found that the mixing percentages of pyrophyllite and sepiolite included in the clay minerals are required to be 34 to 90 percent by weight and 10 to 66 percent by weight, respectively. The present inventor also found that the mixing percentages of diatomaceous earth and zeolite included in the inorganic porous material are required to be 2 to 33 percent by weight and 67 to 98 percent by weight, respectively.

Where an auxiliary constituent material is added, the amount of the auxiliary constituent material is required to be an appropriate amount such that the effects of the present water-based paint are not impaired.

[Method for Preparing Present Water-Based Paint]

The present water-based paint can be prepared by sufficiently kneading the constituent materials mixed in the above amounts using a known kneader and adding water.

[Effects of Present Water-Based Paint]

By selecting the best constituent materials and using the optimum mixing amounts and mixing percentages, the present water-based paint can realize many functions, such as moisture control, deodorizing, fungus prevention, antibacterial activity, formaldehyde reduction, and incombustibility, and excellent workability.

The clay minerals of the present water-based paint have thixotropic properties, allowing for suppression of use of a synthetic resin as a thickener. Thus, natural materials derived from minerals can be used as main constituent materials, allowing a water-based paint safe for humans to be obtained. Also, the present embodiment is able to prevent electrostatic charge and thus to prevent the adhesion of dust or the like to keep the room environment clean.

In the present water-based paint, pyrophyllite and sepiolite are selected as clay minerals, and the thixotropy support agent containing two types of water-soluble cellulose ether having different viscosities as main components and the clay minerals are mixed in appropriate mixing amounts and percentages. Thus, synergy occurs between the clay minerals and thixotropy support agent. Also, the constituent materials are made into fine powders, and the thixotropic index is adjusted to 3.0 to 4.0. Thus, the workability and quality can be improved without impairing the other effects.

While there has been no water-based paint whose thixotropic index is 3.0 to 4.0, the thixotropic index of the present water-based paint is 3.0 to 4.0. Thus, there can be secured the curability and settleability of the present water-based paint that has been applied. Also, the present water-based paint is converted into a liquid when applied and therefore the applicability thereof can be improved. As a result, the present water-based paint can be easily applied without dripping while maintaining fluidity most suitable for application and therefore can be used by any application method, such as roller application, brush application, or spray application. Also, the present water-based paint can be easily used for coating not only by construction specialists but also by common users.

Also, the functions of the metal oxide photocatalyst and diatomaceous earth can improve the base-material concealability without impairing the other effects. Also, the functions of the zeolite and metal oxide photocatalyst can suppress the development of the brown color and increase the whiteness, improving the beauty properties.

Also, the functions of sepiolite, which also has the properties of an inorganic porous material having excellent physical adsorptivity, diatomaceous earth, which is an inorganic porous material, and zeolite, which has physical adsorption properties, as well as an anion exchange function, can improve moisture control properties and deodorizing performance without impairing the other effects. These inorganic porous materials absorb moisture, which causes fungi, and therefore can deliver excellent antifungal performance.

Also, the functions of the metal oxide photocatalyst can exhibit excellent antibacterial performance, deodorizing performance, and air cleaning performance, as well as can improve the application-surface concealability.

Also, the functions of the formaldehyde reducing agent containing the urea compound, organic alkali, and acid as main components have an effect of significantly reducing formaldehyde. That is, the urea compound and organic alkali have an additive relationship with respect to the formaldehyde reduction effect. Both materials react with formaldehyde to form methylol and thus increase the amount of adsorption. At this time, neutralization reaction of the acid proceeds, and the urea compound is converted into methylol or methylene at higher reaction rate. As seen above, formaldehyde is trapped by the chemical reaction and remarkably lost. Note that citric acid may be used as the acid so that formaldehyde becomes subacid (about pH 5.5). Thus, the user is able to safely use the present water-based paint without having to worry that it may adhere to the skin or the like.

Also, the present water-based paint produces chemical synergy between diatomaceous earth and zeolite, which have high incombustibility, and pyrophyllite and sepiolite, which are clay minerals having high incombustibility, and thus exhibits very high heat resistance performance. Thus, a wall surface or the like having the present water-based paint applied thereto delivers high incombustibility performance, allowing for effective suppression of the occurrence of a harmful substance due to fire or the like.

EXAMPLES

Results of tests for verifying various types of performance of the present water-based paint will be described below.

(1) [Example 1] Construction Performance Test Based on Differences Between Mixing Amounts of Constituent Materials A construction performance test was conducted to identify construction performance based on the differences between the mixing amounts of the constituent materials. Test samples were prepared by dispersing and dissolving the following constituent materials in water in the mixing amounts shown in Table 1 (each test sample was prepared using 0.5 kg of the clay minerals). The flexibility (applicability), white color developability, and beauty properties (application-surface concealability and dried-powder survivability) are visually identified, and the thixotropic index (TI value) was measured. Constituent Materials

[A] Clay Mineral
   Pyrophyllite (available from Sanyou Clay Industry Co., Ltd.), particle size 3.0 µm or less
   Sepiolite (available from SHOWA KDE CO., LTD.), particle size 10 µm or less

[B] Thixotropy Support Agent
   67 percent by weight of first agent (available from Shin-Etsu Chemical Co., Ltd.)
   33 percent by weight of second agent (available from Shin-Etsu Chemical Co., Ltd.)

[C] Inorganic Porous Material
   Diatomaceous earth (available from Chuo Silika Co., Ltd.), particle size 10 µm or less
   Zeolite (available from NITTO FUNKA KOGYO K.K.), typical particle size 1.25 µm According to this construction performance test, if the amount of thixotropy support agent is less than 0.02 weight part with respect to 1 weight part of the clay minerals, the viscosity became insufficient, causing dripping; if it exceeds 0.1 weight part, the viscosity became strong, reducing applicability.

Also, if the amount of inorganic porous material is less than 1.0 weight part with respect to 1 weight part of the clay minerals, the white color developability and the after-application base-material concealability were reduced, failing to satisfy predetermined beauty performance; if the amount of inorganic porous material exceeds 3.0 weight parts with respect to 1 weight part of the clay minerals, the balance between the mixing percentages was lost and the viscosity became insufficient. Also, if the amount of water is less than 1.0 weight part with respect to 1 weight part of the fine powder composition (a mixture of the clay minerals, thixotropy support agent, and inorganic porous material; the same applies hereafter), the viscosity became strong, reducing applicability; if it exceeds 3.0 weights parts, dropping occurred.

The results of this construction performance test revealed that it is preferred to mix 0.02 to 0.10 weight part of the thixotropy support agent and 1.0 to 3.0 weight parts of the inorganic porous material with 1 weight part of the clay minerals. The test results also revealed that it is preferred to add 1.0 to 3.0 weight parts of water to 1 weight part of the fine powder composition and that the appropriate range of the thixotropic index is 3.0 to 4.0.

TABLE 1

Mixing Amounts of Constituent Materials of Test Samples and Test Results

| Test sample No. | Fine powder composition | | | Water (w/t parts) with respect to 1 weight part of fine powder composition | Properties | TI value |
| --- | --- | --- | --- | --- | --- | --- |
| | Clay minerals (w/t parts) | Thixotropy support agent (w/t parts) | Inorganic porous material (w/t parts) | | | |
| 1-1 | 1.0 | 0.01 | 1.0 | 2.0 | Weak viscosity | 1.5 |
| 1-2 | 1.0 | 0.02 | 1.0 | 2.0 | ○ | 3.0 |
| 1-3 | 1.0 | 0.10 | 1.0 | 2.0 | ○ | 4.0 |
| 1-4 | 1.0 | 0.11 | 1.0 | 2.0 | Strong viscosity | 4.2 |

TABLE 1-continued

Mixing Amounts of Constituent Materials of Test Samples and Test Results

| | Fine powder composition | | | Water (w/t parts) | | |
|---|---|---|---|---|---|---|
| Test sample No. | Clay minerals (w/t parts) | Thixotropy support agent (w/t parts) | Inorganic porous material (w/t parts) | with respect to 1 weight part of fine powder composition | Properties | TI value |
| 1-5 | 1.0 | 0.02 | 0.9 | 2.0 | Weak viscosity | 2.8 |
| 1-6 | 1.0 | 0.04 | 3.0 | 2.0 | ○ | 3.8 |
| 1-7 | 1.0 | 0.04 | 3.1 | 2.0 | Poor workability | 4.1 |
| 1-8 | 1.0 | 0.04 | 1.0 | 0.9 | Strong viscosity | 4.5 |
| 1-9 | 1.0 | 0.04 | 1.0 | 3.0 | ○ | 3.0 |
| 1-10 | 1.0 | 0.04 | 1.0 | 3.1 | Slight dripping | 2.6 |

○: flexibility (applicability), white color developability, and beauty properties are good (2) [Example 2] Construction Performance Test Based on Differences Between Mixing Percentages of Constituent Materials To identify construction performance based on the differences between the mixing percentages of the constituent materials, test samples were prepared in mixing percentages shown in Table 2, and a construction performance test was conducted.

The amounts of constituent materials and clay minerals used in the test samples were similar to those in Example 1, and the construction performance evaluation index was also similar to that in Example 1. Note that 2.0 weight parts of water were added to 1 weight part of the fine powder composition.

The results of this performance evaluation test revealed that to satisfy predetermined performance, with respect to the clay minerals, it is preferred to mix 34 to 90 percent by weight of pyrophyllite and 10 to 66 percent by weight of sepiolite. The test results also revealed that with respect to the thixotropy support agent, it is preferred to mix 67 to 91 percent by weight of the first agent and 9 to 33 percent by weight of the second agent. The test results also revealed that with respect to the inorganic porous material, it is preferred to mix 2 to 33 percent by weight of diatomaceous earth and 67 to 98 percent by weight of zeolite.

TABLE 2

Mixing Percentages of Test Samples and Test Results

| Test sample No. | Clay minerals (w/t %) | | Thixotropy support agent (w/t %) | | Inorganic porous material (w/t %) | | Properties |
|---|---|---|---|---|---|---|---|
| | Pyrophyllite | Sepiolite | First agent | Second agent | Diatomaceous earth | zeolite | |
| 2-1 | 33 | 67 | 67 | 33 | 2 | 98 | Weak viscosity |
| 2-2 | 34 | 66 | 67 | 33 | 2 | 98 | ○ |
| 2-3 | 90 | 10 | 67 | 33 | 2 | 98 | ○ |
| 2-4 | 91 | 9 | 67 | 33 | 2 | 98 | Strong viscosity |
| 2-5 | 34 | 66 | 66 | 34 | 2 | 98 | Strong viscosity |
| 2-6 | 34 | 66 | 91 | 9 | 2 | 98 | ○ |
| 2-7 | 34 | 66 | 92 | 8 | 2 | 98 | Weak viscosity |
| 2-8 | 34 | 66 | 67 | 33 | 1 | 99 | Strong viscosity |
| 2-9 | 34 | 66 | 67 | 33 | 33 | 67 | ○ |
| 2-10 | 34 | 66 | 67 | 33 | 34 | 66 | Weak viscosity |

○: flexibility (applicability), white color developability, and beauty properties are good (3) [Example 3] Performance Evaluation Test of Inorganic Porous Material and Metal Oxide Photocatalyst A performance evaluation test was conducted to identify moisture control performance, deodorizing performance, and antifungal performance of the inorganic porous material and metal oxide photocatalyst.

The amounts of constituent materials and clay minerals used as test samples were the same as those in Example 1. The mixing ratios of the constituent materials are as shown in Table 3, and performance was evaluated while changing the amounts of added inorganic porous material and metal oxide photocatalyst. Note that titanium oxide was used as the metal oxide photocatalyst.

Mixing Percentages of Constituent Materials

With respect to the clay minerals, 60 percent by weight of pyrophyllite and 40 percent by weight of sepiolite were mixed. With respect to the thixotropy support agent, 75 percent by weight of the first agent and 25 percent by weight of the second agent were mixed, and 0.04 weight part of the thixotropy support agent was added to 1 weight part of the clay minerals. With respect to the inorganic porous material, 20 percent by weight of diatomaceous earth and 80 percent by weight of zeolite were mixed. With respect to water, 2.0 weight parts of water were added to 1 weight part of the fine powder composition.

The performance evaluations were verified using the following method.

A: Moisture Control Performance

The amount of moisture absorbed and released was calculated in accordance with "JIS A 6909 2010 7.32 Absorption/release performance test of construction finish coating material." The test samples were prepared provided that each test sample is applied once in an amount of 0.15 kg/m$^2$.

B: Deodorizing Performance

The odor component concentration of each target odorous gas was measured in accordance with a device analysis test method (detection tube method) stipulated in "General Incorporated Association Japan Textile Evaluation Technology Council SEK mark textile product certification standards (Chapter 6-4 deodorizing performance test)." A 10 cm×15 cm glass plate to which each test sample is applied in 2 to 3 mm was sealed in a 5-liter sampling bag, and 3 liters of the target odor gases was added. The target odor gases and the initial concentrations thereof were ammonia (10 ppm), hydrogen sulfide (15 ppm), and formaldehyde (2.4 ppm). The concentrations were measured after 1 h and after 24 h.

C: Antifungal Performance

A test in which the following five types of fungi are cultivated and the growth states of hyphae generated on the surface of each test sample are investigated by the naked eye was conducted in accordance with "JIS Z 2911 fungus resistance test method." The types of fungi used in the test are as follows:

*Aspergillus niger* (NBRC 105649)
*Penicillium pinophilum* (NBRC 33285)
*Paecilomyces variotii* (NBRC 33284)
*Trichoderma virens* (NBRC 6355)
*Chaetomium globosum* (NBRC 6347)

A glucose-added inorganic salt solution was used as a spore suspension control solution, and a glucose-added inorganic salt agar medium was used as a test agar plate medium.

The ratings of the antifungal performance in Table 3 are as follows:

0: the growth of fungi was not recognized by the naked eye or microscopically.

1: the growth of fungi was not recognized by the naked eye but could be clearly identified microscopically.

4: the hyphae grew well, and the area of the growth portion was 50% or more of the entire area of the sample.

The results of this performance evaluation test revealed that the test samples obtained by adding 1.0 to 3.0 weight parts of the inorganic porous material and 0.1 to 1.0 weight part of the metal oxide photocatalyst to 1 weight part of the clay minerals, 0.40 weight part of the thixotropy support agent, and 2.0 weight parts of water deliver moisture control performance, deodorizing performance, and antifungal performance. The test results also revealed that the test sample obtained by adding less than 0.1 weight part of the inorganic porous material delivers slightly less antibacterial performance, deodorizing performance, and antifungal performance. Note that a test sample obtained by adding more than 1.0 weight part of the metal oxide photocatalyst exhibited a high viscosity, reducing workability (applicability).

TABLE 3

Mixing Amounts with Respect to 1 w/t part of Clay Minerals in Test Samples and Test Results

| Test sample No. | Inorganic porous material (w/t parts) | Metal oxide photocatalyst (w/t parts) | Moisture performance (amount of moisture absorbed and released) (g/m$^2$) | Deodorizing performance (ppm) 1: ammonia 2: hydrogen sulfide 3: formaldehyde | | Antifungal performance |
|---|---|---|---|---|---|---|
| | | | | 1 h concentration | 24 h concentration | |
| 3-0 | None | None | 0 | 1: 10.0<br>2: 15.0<br>3: 2.4 | 1: 9.0<br>2: 14.0<br>3: 2.3 | 4 |
| 3-1 | 1.0 | 0.09 | 15 | 1: 5.0<br>2: 15.0<br>3: 2.4 | 1: 2.0<br>2: 10.0<br>3: 0.1 | 1 |
| 3-2 | 1.3 | 0.1 | 37 | 1: below 0.5<br>2: 2.2<br>3: below 0.1 | 1: below 0.5<br>2: below 0.05<br>3: below 0.02 | 0 |
| 3-3 | 3.0 | 1.0 | 45 | 1: below 0.5<br>2: 2.2<br>3: below 0.1 | 1: below 0.5<br>2: below 0.05<br>3: below 0.02 | 0 |

(4) [Example 4] Incombustibility Performance Evaluation Test

An incombustibility performance evaluation test was conducted to identify the incombustibility performance. Test plates were prepared by preparing test samples in mixing amounts shown in Table 4-1 and applying the test samples to galvanized steel sheets having a thickness of 0.27 mm 500 g/m², and the test plates were tested using the following test method.

TABLE 4-1

Mixing Amounts of Constituent Materials of Test Samples (Test Plates) of Incombustibility Performance Evaluation Test Results

| Test sample No. | Fine powder composition | | | Water (w/t parts) with respect to 1 weight part of fine powder composition |
|---|---|---|---|---|
| | Clay minerals (w/t parts) | Thixotropy support agent (w/t parts) | Inorganic porous material (w/t parts) | |
| 4-1 | 1.0 | 0.04 | 1.5 | 2.0 |
| 4-2 | 1.0 | 0.04 | 2.25 | 2.0 |
| 4-3 | 1.0 | 0.04 | 3.0 | 2.0 |

Each test plate had a cylindrical shape, a diameter of 44 mm, and a thickness of 50 mm. Before the test, each test plate was cured so that the mass is constant at a temperature of 23° C. and a relative humidity of 50%. After an empty heating furnace, into which the test plate was yet to be inserted, was heated for 30 min and the in-furnace temperature was maintained at 750° C., the test plate was placed 10 mm away from the inner surface of the wall of the heating furnace and in the center of the height of the furnace wall. Then, the gross calorific value (MJ/m²) for 20 min was measured, the surface state and the ignition state were visually observed, and the occurrence situation of an toxic gas was checked.

In Japan, the incombustibility performance of an incombustible material is required to satisfy criteria stipulated in Building Standards Law Article 2, No. 9 and Enforcement Ordinance thereof Article 108-2. If fire heat is applied to a building material in case of normal fire, the building material is required to satisfy the requirements described in the following numbers for 20 min after heating is started.

No. 1: the building material does not burn.

No. 2: the building material does not cause deformation, melting, cracking, or other damages that is detrimental to fire prevention.

No. 3: the building material does not cause smoke or gas that is detrimental to evacuation.

According to the incombustibility performance evaluation test (Table 4-2), the gross calorific value in each elapsed time of three test plates that satisfy the mixing percentages of the present water-based paint largely fell below 8.0 MJ/m², which is a reference value that a common incombustible material is required to satisfy. Also, no back side through hole or crack was made on those test plates. Further, the test plates did not ignite or produce a toxic gas. That is, the test results revealed that the test plates having the test sample applied thereto satisfy the provisions of the Building Standards Law and deliver very high heat-resistant and incombustibility performance and that the present water-based paint delivers excellent heat-resistant performance.

TABLE 4-2

Results of Incombustibility Performance Evaluation Test

| Test sample No. | Gross calorific value (MJ/m²) | | | Highest calorific value (kW/m²) [occurrence time] | State of test plate | Occurrence of toxic gas |
|---|---|---|---|---|---|---|
| | 5 min | 10 min | 20 min | | | |
| 4-1 | 0.36 | 0.36 | 0.36 | 12.46 [54 sec] | No back side through hole or crack | No |
| 4-2 | 0.34 | 0.34 | 0.34 | 11.55 [52 sec] | No back side through hole or crack | No |
| 4-3 | 0.32 | 0.32 | 0.32 | 11.10 [50 sec] | No back side through hole or crack | No |

(5) [Example 5] Performance No Evaluation Test of Added Formaldehyde Reducing Agent A performance evaluation test was conducted to identify the formaldehyde reduction performance of the formaldehyde reducing agent.

As test samples, there were used ones obtained by adding the formaldehyde reducing agent to the No. 1-2 test sample of Example 1 above at a ratio of 0.003 weight part of the formaldehyde reducing agent to 1 weight part of the clay mineral.

The performance of the added formaldehyde reducing agent was verified using the following method. Each test sample (test samples applied to one surface of a 10 cm×15 cm glass plate and then dried) was set in the central portion of a glass container (a vacuum desiccator having a volume of 12 liters), the container was evacuated and decompressed, then formaldehyde control air was sealed into the container, and the test sample was left to stand. After a predetermined time, the air in the container was extracted, and the formaldehyde concentration in the air was measured. The formaldehyde exposure conditions were as follows: the initial concentration 3.0 ppm; the temperature 23° C.; and the humidity 50%.

According to this performance evaluation test, the in-air formaldehyde concentrations after lapses of respective times were as follows: 1 h-lapse value 0.07 ppm; 4 h-lapse value 0.02 ppm; and 24 h-lapse and 48 h-lapse values less than 0.02 ppm (residual ratio less than 0.6%). Thus, the usefulness of the formaldehyde reducing agent was revealed.

The present water-based paint is able to maintain fluidity most suitable for application and thus can be easily applied without dripping. For this reason, the present water-based paint can be used by any application method, such as roller application, brush application, or spray application. Also, the present water-based paint can be easily used for coating not only by construction specialists but also by common users.

According to the present embodiment, a water-based paint can be provided that has many functions, such as moisture control, deodorizing, formaldehyde reduction, fungus prevention, and antibacterial activity, and has excellent safety, workability, and heat resistance. Also, the present embodiment can provide a water-based paint that includes main constituent materials formed from mineral-derived natural substances and is harmless for humans.

What is claimed is:

1. A water-based paint comprising:
a fine powder composition comprising:
   fine powdery clay minerals comprising pyrophyllite and sepiolite;
   a fine powdery thixotropy support agent comprising:
      a first agent which is a water-soluble cellulose including hydroxypropyl methylcellulose as a main component and which has 2 percent by weight aqueous solution viscosities at 20° C. of 2400 mPa·S to 4500 mPa·S; and
      a second agent which is a water-soluble cellulose including hydroxypropyl methylcellulose as a main component and which has 2 percent by weight aqueous solution viscosities at 20° C. of 64000 mPa·S to 90000 mPa·S; and
   a fine powdery inorganic porous material comprising diatomaceous earth and zeolite;
a thixotropic index when the fine powder composition is dispersed and dissolved in water being 3.0 to 4.0; and
the thixotropy support agent comprising 67 to 91 percent by weight of the first agent and 9 to 33 percent by weight of the second agent.

2. The water-based paint of claim 1, wherein
in the clay minerals, 34 to 90 percent by weight of the pyrophyllite and 10 to 66 percent by weight of the sepiolite are mixed,
in the inorganic porous material, 2 to 33 percent by weight of the diatomaceous earth and 67 to 98 percent by weight of the zeolite are mixed,
the fine powder composition comprises 0.02 to 0.10 weight part of the thixotropy support agent and 1.0 to 3.0 weight parts of the inorganic porous material with respect to 1 weight part of the clay minerals, and
the fine powder composition is dispersed and dissolved in the water by adding 1.0 to 3.0 weight parts of the water to 1 weight part of the fine powder composition.

3. The water-based paint of claim 1, wherein
in the clay minerals, 34 to 90 percent by weight of the pyrophyllite and 10 to 66 percent by weight of the sepiolite are mixed,
in the inorganic porous material, 2 to 33 percent by weight of the diatomaceous earth and 67 to 98 percent by weight of the zeolite are mixed,
the fine powder composition further comprises a fine powdery metal oxide having photocatalyst activity,
the fine powder composition comprises 0.02 to 0.10 weight part of the thixotropy support agent, 1.0 to 3.0 weight parts of the inorganic porous material, and 0.1 to 1.0 weight part of the metal oxide having photocatalyst activity with respect to 1 weight part of the clay minerals, and
the fine powder composition is dispersed and dissolved in the water by adding 1.0 to 3.0 weight parts of the water to 1 weight part of the fine powder composition.

4. The water-based paint of claim 1, wherein
in the clay minerals, 34 to 90 percent by weight of the pyrophyllite and 10 to 66 percent by weight of the sepiolite are mixed,
in the inorganic porous material, 2 to 33 percent by weight of the diatomaceous earth and 67 to 98 percent by weight of the zeolite are mixed,
the fine powder composition further comprises a formaldehyde reducing agent containing a urea compound, organic alkali, and acid as main components,
the fine powder composition comprises 0.02 to 0.10 weight part of the thixotropy support agent and 1.0 to 3.0 weight parts of the inorganic porous material with respect to 1 weight part of the clay minerals, and
the fine powder composition is dispersed and dissolved in the water by adding 1.0 to 3.0 weight parts of the water to 1 weight part of the fine powder composition.

* * * * *